(12) United States Patent
Muraszewski et al.

(10) Patent No.: US 9,458,836 B2
(45) Date of Patent: Oct. 4, 2016

(54) WIND TURBINE COMPRISING A DETUNER

(75) Inventors: Steffen Muraszewski, Schwerin (DE); Jørgen Jakobsen, Nørager (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 822 days.

(21) Appl. No.: 13/807,423

(22) PCT Filed: Jul. 1, 2011

(86) PCT No.: PCT/DK2011/050256
§ 371 (c)(1),
(2), (4) Date: Mar. 14, 2013

(87) PCT Pub. No.: WO2012/003832
PCT Pub. Date: Jan. 12, 2012

(65) Prior Publication Data
US 2013/0189100 A1    Jul. 25, 2013

Related U.S. Application Data (60) Provisional application No. 61/362,529, filed on Jul. 8, 2010.

(30) Foreign Application Priority Data

Jul. 8, 2010    (DK) .......................... PA 2010 70321

(51) Int. Cl.
*F03D 11/02*      (2006.01)
*F03D 15/00*      (2016.01)
(Continued)

(52) U.S. Cl.
CPC .............. *F03D 15/00* (2016.05); *F03D 7/0296* (2013.01); *F16F 15/1414* (2013.01);
(Continued)

(58) Field of Classification Search
CPC ...... F03D 7/0296; F03D 11/02; F03D 15/00; F05B 2260/40311; F05B 2260/96; F05B 2270/333; F16H 15/0006; F16H 57/0006; F16F 15/1414; Y02E 10/722; Y02E 10/723

USPC ............................................................ 416/1
See application file for complete search history.

(56) References Cited

U.S. PATENT DOCUMENTS 5,634,866 A    6/1997 Sudau
8,123,484 B2 *    2/2012 Choi ....................... F03D 11/00
                                                                    416/145
(Continued)

FOREIGN PATENT DOCUMENTS

DE    10 2008 062 512    6/2010
WO    2007/140787        12/2007
WO    2008/074866        6/2008

OTHER PUBLICATIONS

Sensitivity Analysis of Natural Frequency for Gear Driven System of Wind Turbine, Liu Yongqian and Long Quan and Yang Yongping, 2010 International Conference on Computer, Mechatronics, Control and Electronic Engineering (CMCE).*

(Continued)

*Primary Examiner* — William H Rodriguez
*Assistant Examiner* — Stephen Mick
(74) *Attorney, Agent, or Firm* — Patterson + Sheridan LLP (57) ABSTRACT

A wind turbine comprises a wind-driven rotor for converting wind energy to a mechanical driving force, a power converter for converting the driving force to exploitable power, and a drive train for rotatably transmitting the driving force from the wind-driven rotor to the power converter. The drive train includes: at least one rotatable driving element configured to provide at least one torsional resonance frequency in the drive train; a first detuner having at least one first mass element with a first mass inertia and at least one first elastic element with first elastic properties; and a second detuner having at least one second mass element with a second mass inertia and at least one second elastic element with second elastic properties. The first and second mass elements and first and second elastic elements are arranged to rotate during operation of the wind turbine. The torsional resonance frequency is influenced by the first and second mass inertias and the first and second first elastic properties.

17 Claims, 10 Drawing Sheets

(51) Int. Cl.
*F03D 7/02* (2006.01)
*F16F 15/14* (2006.01)
*F16H 57/00* (2012.01)

(52) U.S. Cl.
CPC *F16H 57/0006* (2013.01); *F05B 2260/40311* (2013.01); *F05B 2260/96* (2013.01); *F05B 2270/333* (2013.01); *Y02E 10/722* (2013.01); *Y02E 10/723* (2013.01)

(56) References Cited

U.S. PATENT DOCUMENTS

| | | | |
|---|---|---|---|
| 2009/0058094 A1* | 3/2009 | Jansen | F03D 11/0008 290/55 |
| 2009/0142193 A1* | 6/2009 | Bech | F03D 1/0675 416/144 |
| 2010/0013234 A1* | 1/2010 | Sloth | F03D 11/02 290/55 |
| 2010/0219642 A1* | 9/2010 | Kim | F03D 11/0008 290/55 |

OTHER PUBLICATIONS

Marcin Król; International Search Report and Written Opinion issued in priority International Application No. PCT/DK2011/050256; Feb. 23, 2012; 10 pages; European Patent Office.

Jens Skou; 1st Technical and Search Report issued in priority Denmark Application No. PA 2010 07321; Mar. 8, 2011; 5 pages; Denmark Patent and Trademark Office.

* cited by examiner

WIND TURBINE COMPRISING A DETUNER

TECHNICAL FIELD

The present invention relates to a wind turbine and particularly to improvements to a wind turbine comprising first and second detuners in its drive train. Embodiments of the invention address problems related to torsional vibrations.

BACKGROUND

Whereas significant improvements have been made in the development of drive trains for wind turbines, problems remain with regard to lifetime of mechanical drive elements, notably with regard to gearboxes. The lifetime of gearboxes is negatively influenced by torsional vibrations in particular.

Aerodynamic forces acting on the rotor blades of the wind turbine, and/or forces from interacting gearwheels in a gearbox of the drive train, such as so-called gear meshing frequency, may excite torsional resonances in the drive train. As a consequence of excited torsional resonances, undesired loads are imparted on the drive elements of the drive train. It has moreover been found that tonality, i.e. noise emitted from the wind turbine, occurs as a consequence of torsional vibrations in the drive train.

Prior art document WO 2007/140787 discloses a wind turbine comprising a detuner, which is employed to at least partially control the torsional resonance frequency of the drive train or components thereof. The detuner may e.g. comprise an adjustable damper as disclosed in European Patent Publication No. EP 1 197 678.

Though the wind turbine of WO 2007/140787 presents a clear progress in the reduction of tonality, it has been found that problems still exist in this regard, in particular, but not exclusively, in wind turbines comprising multi-stage gearboxes. Hence, one object of the invention is to provide an improvement to the drive train of a wind turbine that reduces the risk of excitement of torsional resonances in the drive train, and particularly in drive trains including multi-stage gearboxes.

SUMMARY

The description below discloses embodiments of a wind turbine comprising a wind-driven rotor for converting wind energy to a mechanical driving force, a power converter for converting the driving force to exploitable power, and a drive train for rotatably transmitting the driving force from the wind-driven rotor to the power converter. The drive train includes:

at least one rotatable driving element giving rise to at least one torsional resonance frequency;

a first detuner having at least one first mass element with a first mass inertia and at least one first elastic element with first elastic properties, the first mass element and the first elastic element being arranged to rotate during operation of the wind turbine; and a second detuner having at least one second mass element with a second mass inertia and at least one second elastic element with second elastic properties, the second mass element and the second elastic element being arranged to rotate during operation of the wind turbine. The torsional resonance frequency is influenced by said first and second mass inertias and said first and second elastic properties.

The first and second detuners may be arranged at different locations in the drive train. Indeed, the first and second detuners may be mounted to or in different rotatable driving elements. As used herein, the term "rotatable driving element" refers to any shaft, coupling, gearbox (or component thereof), brake, or other rotatable element in the drive train. In one embodiment including a gearbox, for example, the first detuner may be mounted a gearbox output shaft and the second detuner may be mounted between two stages in the gearbox. Alternatively, the detuners may be provided at the same location, e.g. both at the gearbox output shaft or both between two stages in the gearbox.

Regardless, the provision of separate detuners allows them to be tuned to different frequencies, which may be overlapping ranges, so as to achieve attenuation of the torsional resonance frequency over a broader band than what would have been achievable by a single detuner only. This overlapping range preferably includes an operating frequency giving rise to tonality to be attenuated. For example, in one embodiment the first and second detuners may be tuned for first and second frequencies, with one of the first and second frequencies being lower than an operating frequency and the other of the first and second frequencies being higher than the operating frequency. The difference between the first and second frequencies may be less than 10%, for example.

In a further aspect or embodiment, the at least one rotatable driving element of the drive train comprises a gearbox arranged between the wind-driven rotor and the power converter, and the operating frequency derives from a tooth mesh frequency in the gearbox. In a still further aspect, the gearbox includes a first planetary stage with a ring gear, planet wheels, and sun shaft. The operating frequency derives from a tooth mesh frequency between the planet wheels and sun shaft.

It has surprisingly been found that the provision of two detuners may provide a larger attenuation than the sum of the attenuation obtainable by each of them.

DETAILED DESCRIPTION

Figure 1:
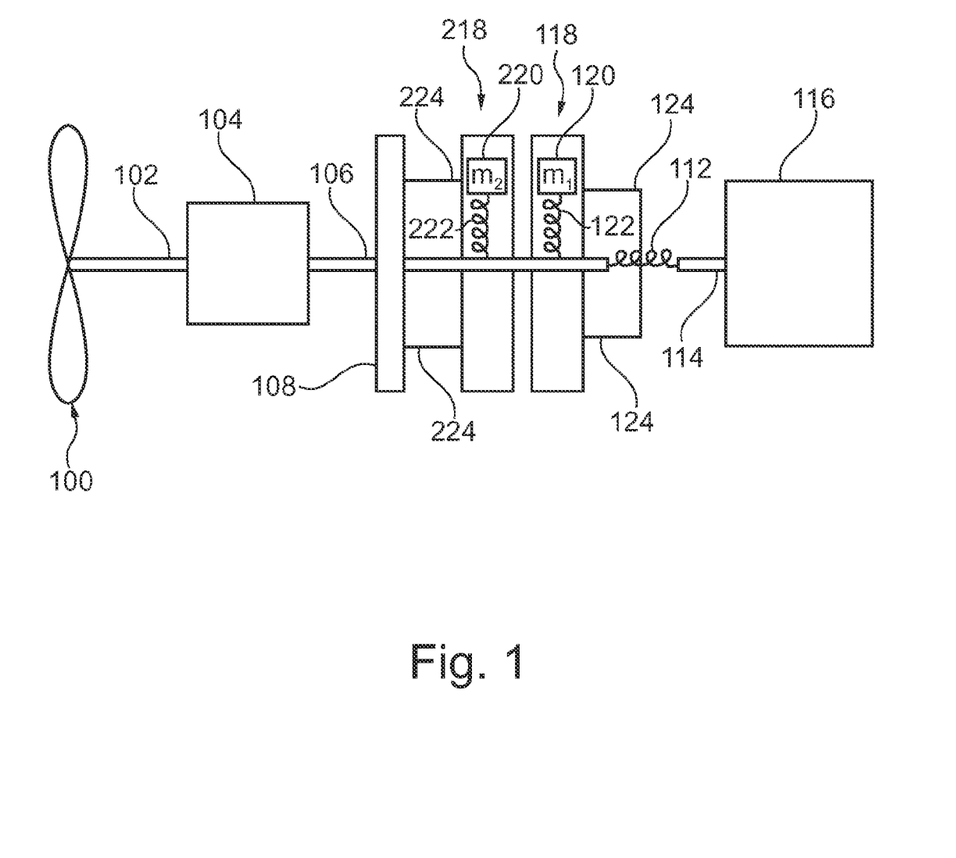
FIG. 1 illustrates a first embodiment of a wind turbine according to the invention.

The wind turbines schematically illustrated in FIG. 1 comprises a wind-driven rotor 100 comprising, e.g., three rotor blades. The rotor 100 drives an input shaft 102 for a gearbox 104, an output shaft 106 of which extends to a brake 108. A downstream shaft 110 extends to a coupling element 112, which is connected to a power converter 116 via a further shaft 114. It will be appreciated that the shafts 102, 106, 110 and 114 as well as the gearbox 104, brake 108 and coupling 112 form part of a drive train of the wind turbine for transmitting a mechanical driving force from the rotor 100 to the power converter 116. The power converter 116 may e.g. comprise a generator for converting the mechanical driving force to exploitable power, such as electricity.

Figure 2:
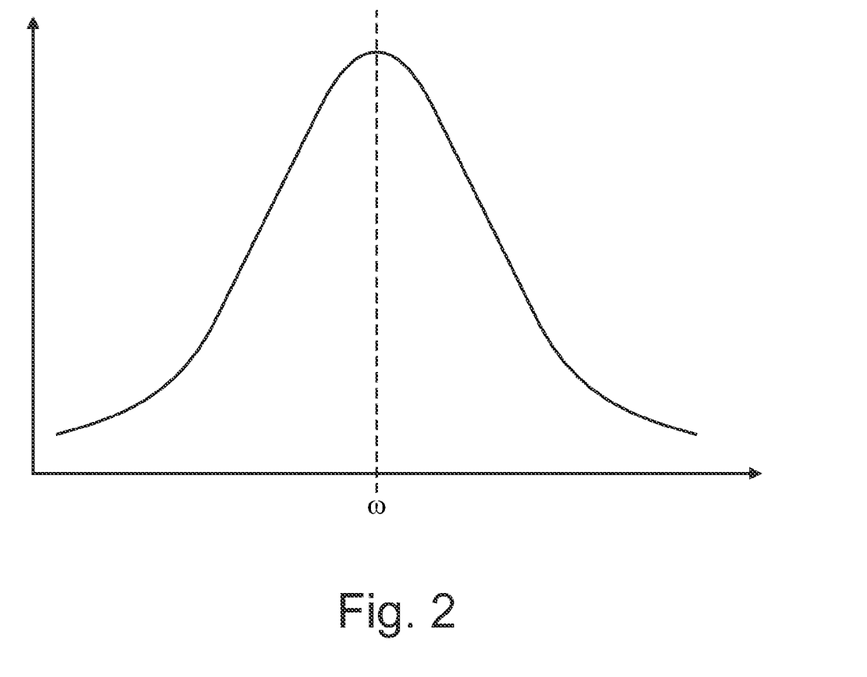
FIG. 2 illustrates torsional resonance frequencies in a drive train of a wind turbine comprising no detuner.

The elements of the drive train define at least one torsional resonance frequency. If a torsional resonance frequency is excited by forces occurring during operation in the drive train, then undesired loads and tonality occur. This will be appreciated from the diagram in FIG. 2, in which the amplitude of torsional vibrations is depicted as a function of the frequency of the vibrations. In FIG. 2, ω indicates the resonance torsional frequency of the drive train. Torsional resonance is excited in the drive train if torsional forces are imparted to the drive train at a frequency coinciding with the resonance frequency, ω. It has been found that such excitement of torsional resonance is often the cause of tonality, and that it may also reduce lifetime of mechanical parts, such as gearboxes.

In order to ensure that the torsional resonance frequency of the drive train, ω, does not coincide with the frequency at which forces are imparted to the drive train, the wind turbine of FIG. 1 includes first and second detuners 118 and 218 with respective mass elements 120 and 220, and respective elastic elements 122 and 222. In the embodiment of FIG. 1, a first one of the detuners 118 is mounted to the coupling element 112 as illustrated by brackets 124, whereas a second one of the detuners 218 is mounted to the brake 108 as illustrated by brackets 224. Due to the provision of the detuners 118 and 218, the torsional resonance frequency is influenced by the mass inertia of the mass elements and the elastic properties of the elastic elements. Hence, the torsional resonance frequency may be controlled so that it does not coincide with frequencies occurring in the drive train during operation of the wind turbine.

Figure 3:
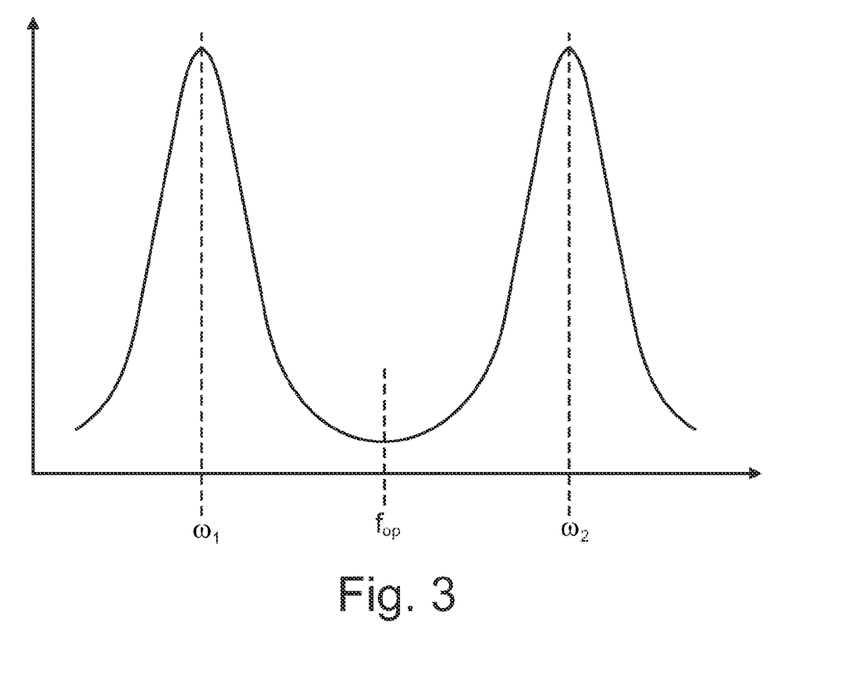
FIGS. 3 and 4 illustrate torsional resonance frequencies in drive trains of wind turbines comprising first and second detuners.
Figure 4:
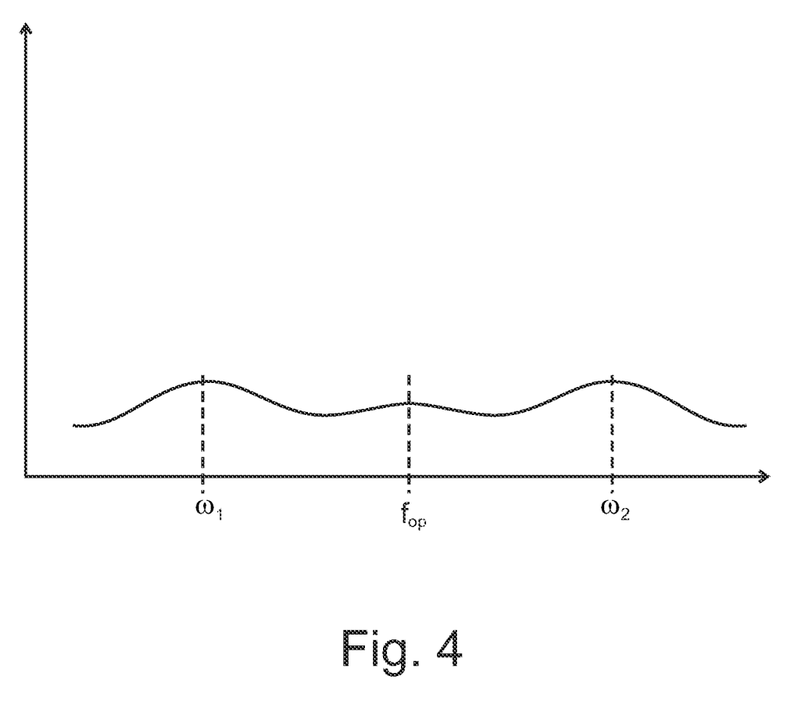

For example, as shown in FIGS. 3 and 4, the first and second detuners may result in that the drive train defines two torsional resonance frequencies ω1 and ω2, each of which are remote from the frequency of imparted forces, $f_{op}$ ("operating frequency"). The effect of such control of the torsional resonance frequency is that undesired loads do not occur to the same extent in the drive train as would be the case without the detuners 118 and 218, and that tonality is reduced. FIG. 3 shows the effect of a single detuner specifically tuned for the resonance frequency ω, whereas FIG. 4 shows the effect of two detuners tuned for frequencies close to ω, but not exactly ω, and/or which are arranged at different positions in the drive train, e.g. one at the output shaft of the gearbox and one at an intermediate stage in the gearbox. It has been found that the overlapping attenuation achieved by two or more detuners provides an improved effect over prior art systems incorporating only a single detuner. Specifically, the provision of two or more detuners may provide attenuation over a broader frequency band than what is obtainable by a single detuner only, and the attenuation achieved may be larger than the sum of the attenuation obtainable by each of the detuners if employed in isolation. In the example of FIG. 4, the operating frequency $f_{op}$ may e.g. be a meshing frequency of the sun wheel of a first planetary gear stage in the gearbox of a wind turbine, which in respect of a wind turbine operated at a rotor rpm of about 15-20 rpm has been found to be in the range of between 120 and 150 Hz, for example approximately 135 Hz. In FIG. 4, ω1 and ω2 may represent the torsional resonance frequencies, for which two separate detuners of the wind turbine are designed. The relative difference between the torsional frequencies for which the two detuners are tuned is typically less than 10%, e.g. 5-10%, or, in absolute numbers, 5-20 Hz. For example, the first detuner may be tuned to ω1=130 Hz, and the second detuner may be tuned to ω2=140 Hz.

Figure 5:
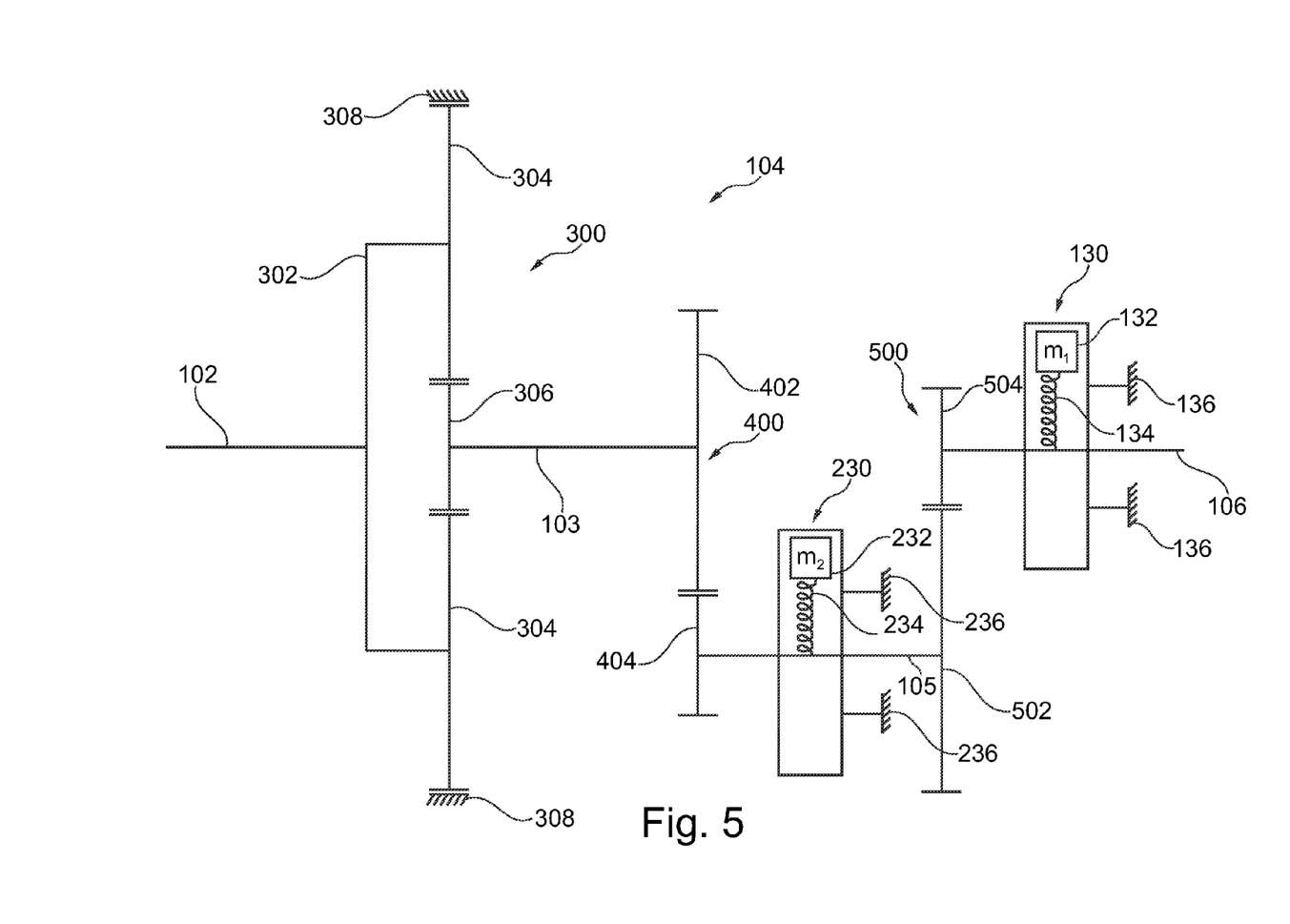
FIGS. 5-7 illustrate multi-stage gearboxes of wind turbines according to the invention.
Figure 6:
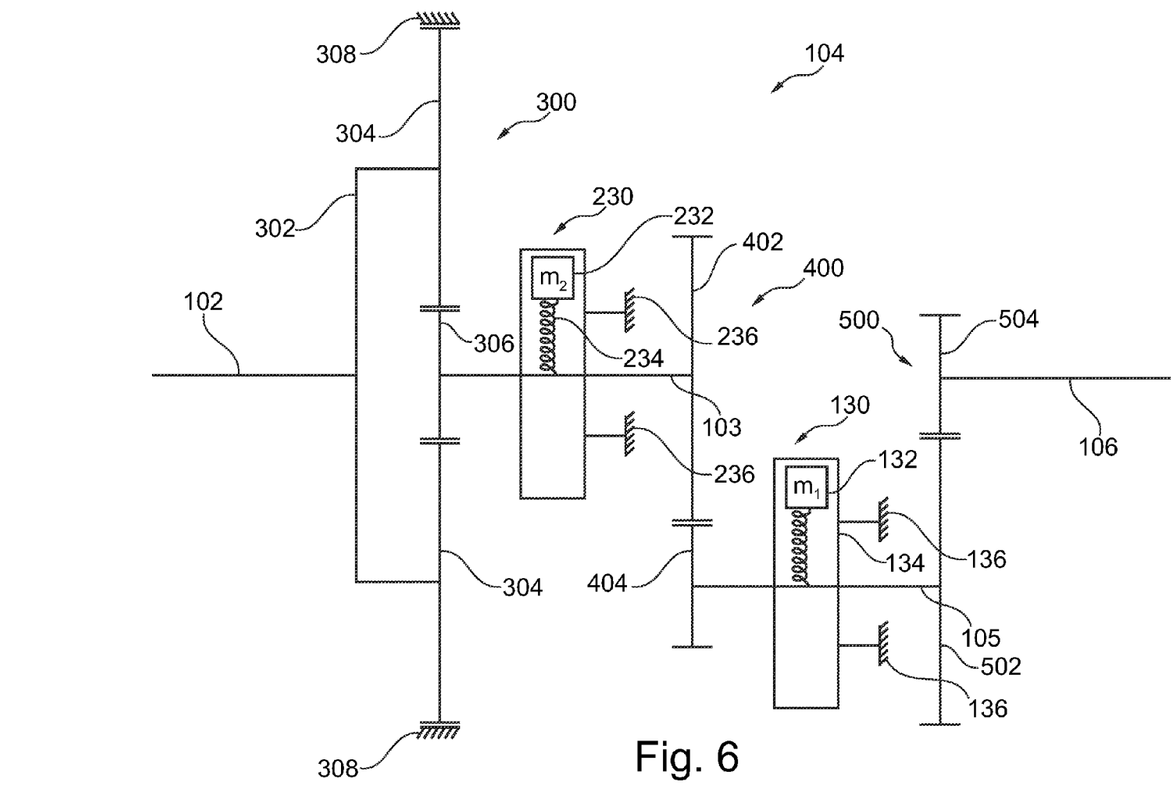
Figure 7:
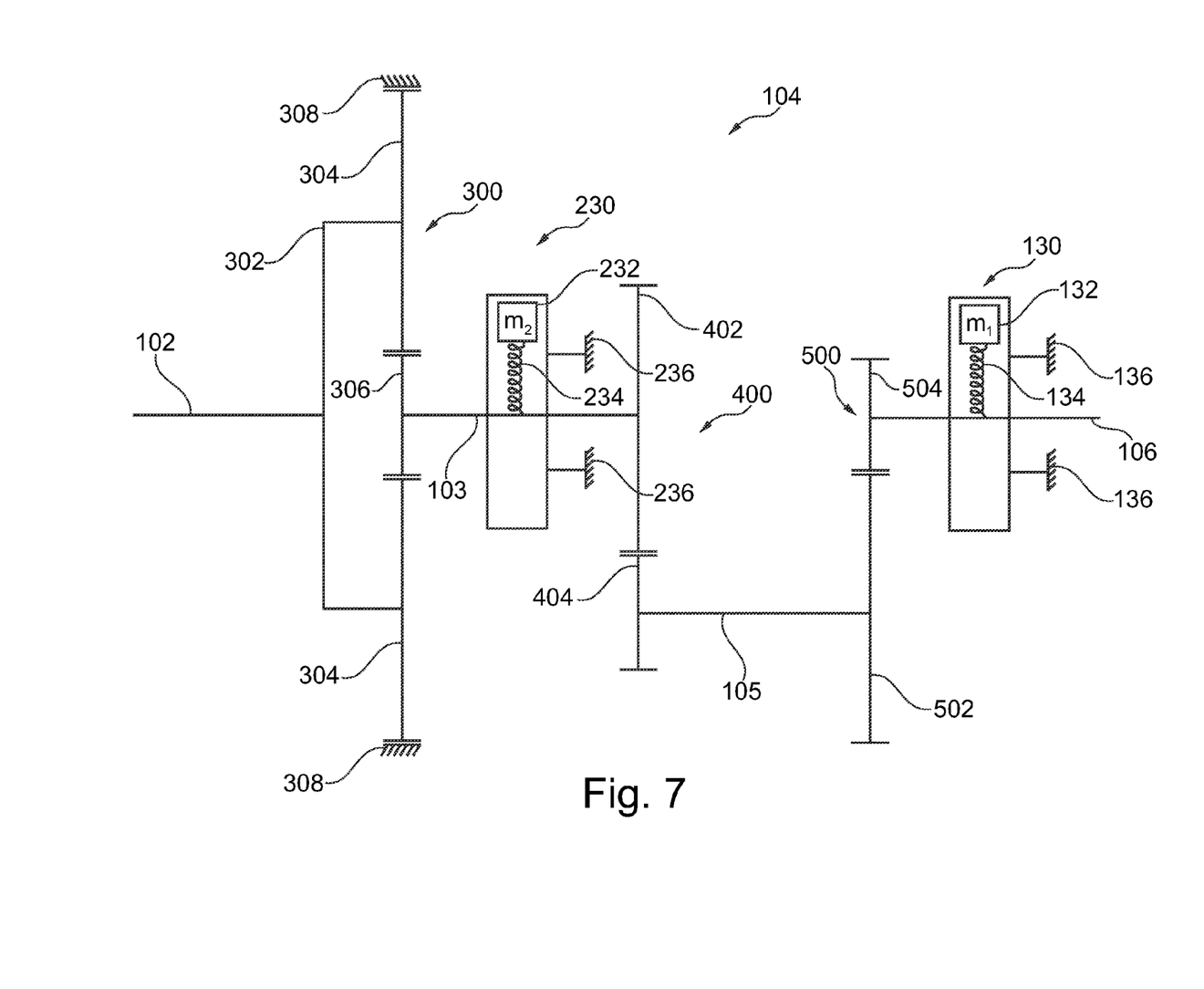

Embodiments of the invention are further illustrated in FIGS. 5-7, schematically illustrating a three-stage gearbox 104 of a wind turbine. The gearbox comprises a first stage 300 comprised of a planetary gear arrangement with a carrier 302 rotating with the rotor shaft 102, the carrier 302 driving planet wheels 304, which roll along ring wheel 308, and which further are in meshing engagement with sun wheel 306. The sun wheel 306 in turn drives a first intermediate shaft 103, which drives a first gearwheel 402 of a second stage 400 of the gearbox. In the second stage 400 the gearwheel 402 drives a further gearwheel 404, which is connected to a second intermediate shaft 105. The second intermediate shaft 105 connects the second gearbox stage 400 to a third stage 500 comprised of gearwheels 502 and 504. The gearwheel 504 is connected to gearbox output shaft 106.

The embodiment of FIG. 5 comprises a first detuner 130 arranged at the output shaft of the third and final stage 500 of the gearbox 104. The detuner 130 comprises a first mass 132, and a first elastic element 134, which connects the mass 132 to the gearbox output shaft 106. The detuner 130 is supported by a fixed support 136, which may e.g. be in the form of brackets 124 or 224 as shown in FIG. 1. The embodiment of FIG. 5 further comprises a second detuner 230, comprising a second mass 232 connected to the intermediate shaft 105 between the second and third stages 400 and 500 of the gearbox. The fixed supports 236 preferably form supports for the detuner 230, connecting it e.g. to a portion of a housing of the gearbox.

In the embodiment of FIG. 6, the first detuner 130 is arranged between the second and third stages 400 and 500 of the gearbox, and the second detuner 230 is arranged between the first and second stages 300 and 400. FIG. 7 illustrates a further embodiment, in which the first detuner 130 is arranged at the output shaft 106, and the second detuner 230 is arranged between the first and second stages 300 and 400 of the gearbox.

Other configurations are possible, including configurations with only one detuner arranged between any of the stages of the gearbox, or at the output shaft 106. Further, more than two detuners may be provided. For example, two separate detuners may be provided at the output shaft 106 in combination with no detuners within the gearbox, or in combination with any number of detuners at the various stages of the gearbox.

Generally, the detuners employed in the various aspects of the present invention may have a vibrating inertia of between 1 and 100 kgm², such as between 2 and 10 kgm². The stiffness of the elastic element may be in the range of between 1 and 20 million Nm/rad, such as between 1 and 10 Nm/rad. In embodiments of the invention comprising two or more detuners, their vibrating inertia and/or stiffness may be identical, even if they are arranged at different locations in the drive train. In other embodiments, the vibrating inertia and/or stiffness of the various detuners may be different.

Figure 8:
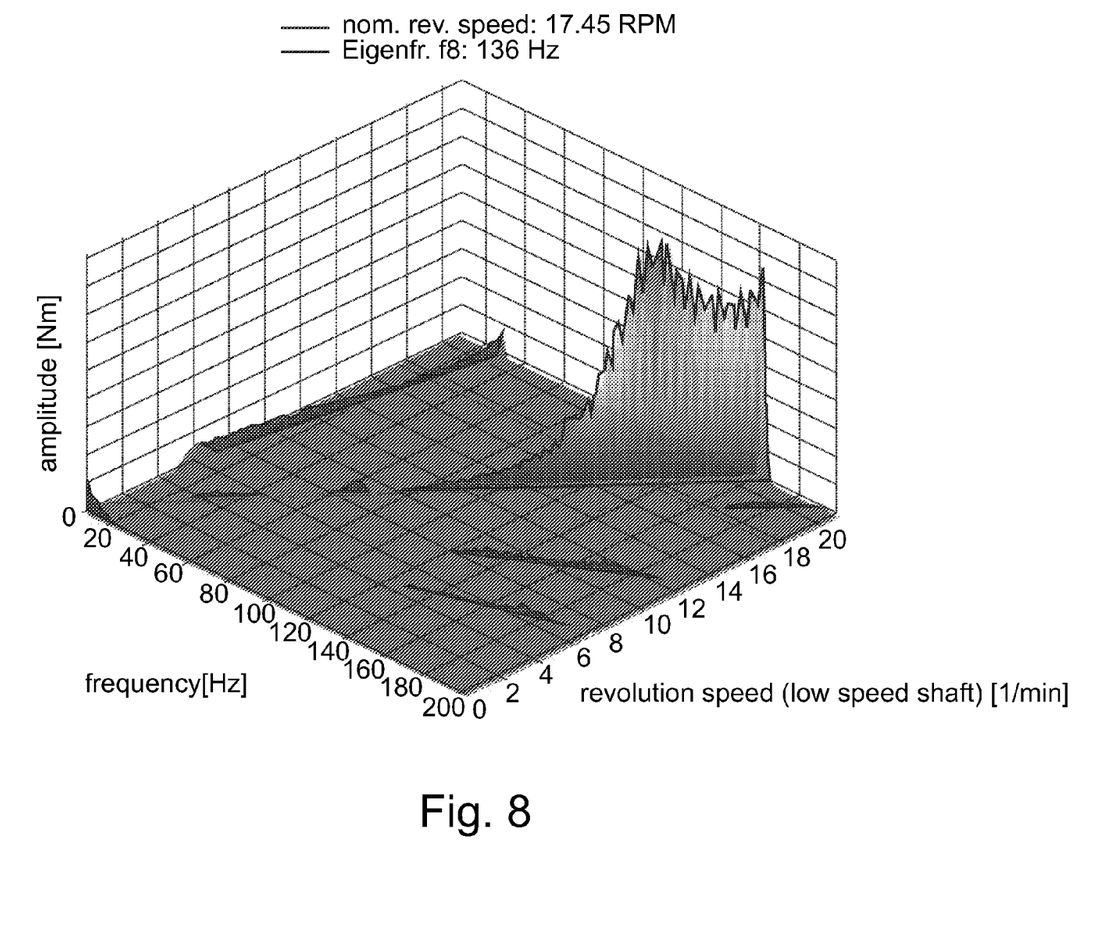
FIG. 8 illustrates results of a numerical simulation of torsional resonance in a drive train of a wind turbine comprising no detuner.

FIG. 8 illustrates the torque amplitude of torsional vibrations in a numerical simulation of a drive train of a wind turbine including no detuner. The nominal rpm of the rotor shaft is 17.45 rpm, and as shown a torsional resonance frequency occurs at 136 Hz, which, in the numerical simulation, is excited by the tooth mesh frequency of the first stage of a three-stage gearbox.

Figure 9:
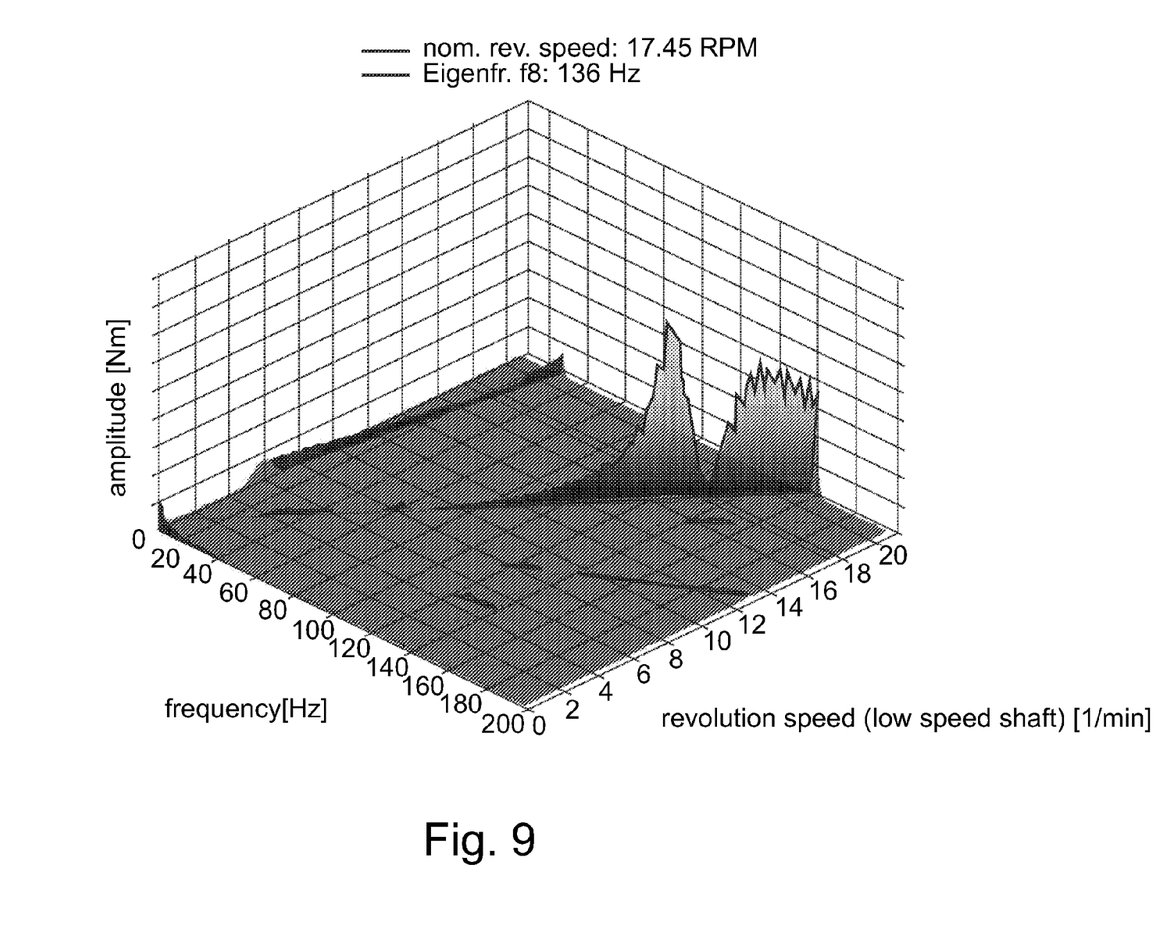
FIGS. 9 and 10 illustrate results of numerical simulation of torsional resonance in a drive train of a wind turbine comprising first and second detuners.
Figure 10:
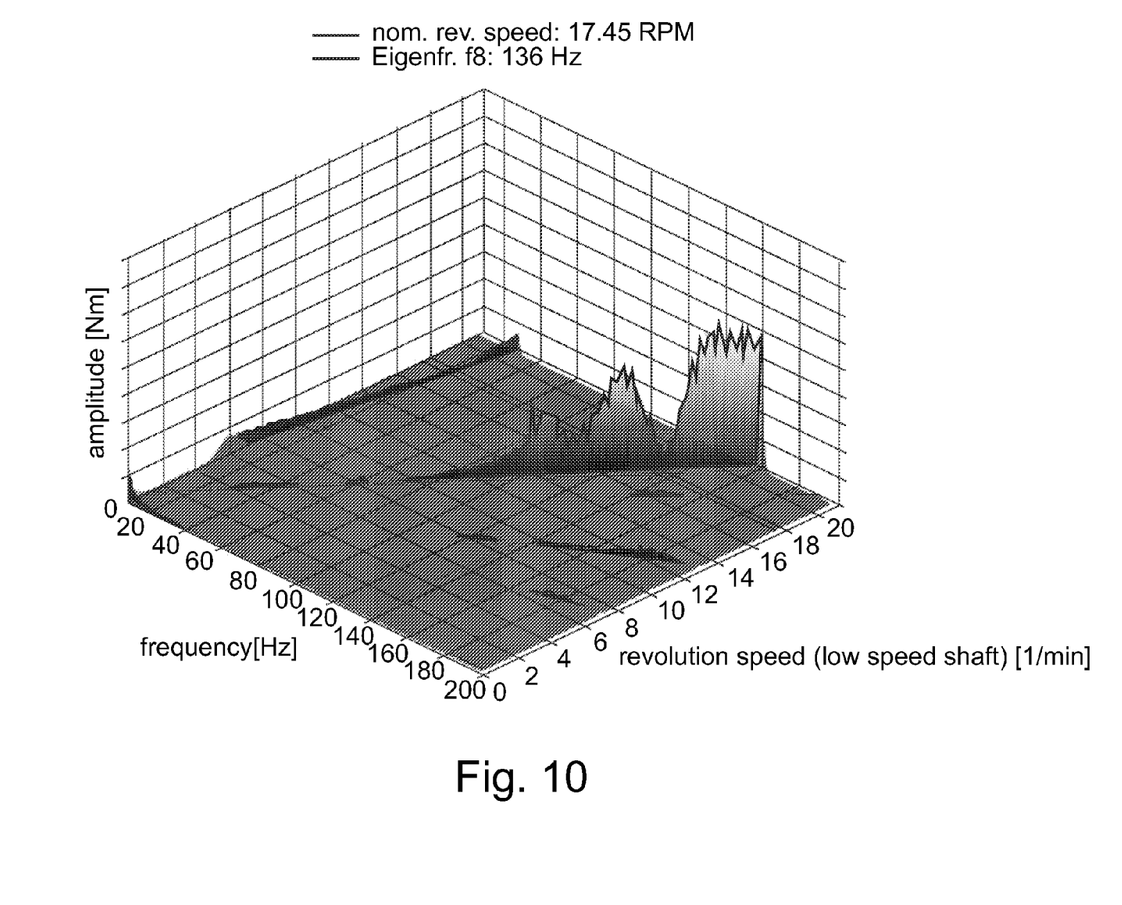

In the simulation of FIG. 9, a detuner is provided between the second and third stage of the gearbox, and as shown, the detuner nearly provides a complete elimination of the excitement of torsional resonance frequency. In the simulation of FIG. 10, two detuners have been employed, one at the gearbox output shaft, and one between the second and third stages of the gearbox.

Generally the torsional resonance frequency is influenced by the mass inertia and the elastic properties of the detuner or detuners employed in accordance with the present invention. Hence, the torsional resonance frequency may be controlled so that it does not coincide with frequencies occurring in the drive train during operation of the wind turbine. In case the detuner allows the elastic properties of the elastic element of the detuner to be varied, e.g. by setting a distortion of the elastic element, the torsional resonance frequency in the drive train may be controlled or set once the wind turbine has been installed at its site of operation, or even varied during operation. Alternatively, if the exciting frequencies are known at the stage of designing the drive train, the parameters of the detuner, including the mass inertia of the mass element and/or the elasticity of the elastic element, may be chosen already at the design stage by appropriate modeling of the drive train.

The elastic element may e.g. be made from rubber, latex or any other material having elastic properties, including various plastics materials, such as various types of Nylon. Typically, Nylon is used in the elastic element for detuning relatively high frequencies, whereas rubber or latex is used for detuning relatively low frequencies.

The power converter may include a generator for converting the mechanical driving force to electricity. It should, however, be understood that the power converter may also include a mechanical system, e.g. a gearbox system, for further transmission of mechanical driving force.

The at least one driving element may include any shaft, gearbox or other rotatable element in the drive train, through which a mechanical driving force is transmitted.

In the present context, the term frequency may designate a frequency measured in vibrations per second (Hz) and/or an angular velocity measured in radians per second. The torsional vibrations giving rise to tonality in wind turbines usually have a frequency of about 50-1000 Hz.

The detuner(s) may be mounted radially around a drive shaft of the drive train. For example, the elastic element may include or be in the form of a substantially annular elastomeric element. This element may be supported by a supporting structure, such as one more annular members, whose inner circumference or circumferences encircle an outer circumference of the elastic element. Several elastic elements may be provided. In one embodiment, the outer circumference of the elastic element is essentially v-shaped when seen in longitudinal cross section. Thus, the elastic element may have a smaller outer diameter towards its ends than towards its middle to define opposing conical portions. In such an embodiment, the supporting structure may comprise two opposing support elements for engaging the respective conical portions of the elastic element, the support elements being essentially annular, with their inner circumferences defining inverted cones. The support elements may be permanently held together in fixed mutual relationship. Alternatively, their mutual relationship, i.e. position with respect to each other, may be variable. For example, they may be mutually fixed and held together by a releasable fastener, such as a screw or bolt. The variable mutual position of the support elements allow the distortion of the elastic element to be varied, as the force exerted by the support elements on the elastic element varies with the mutual position of the support elements. The elastic properties of the elastic element may thereby be varied. Other configurations are possible, which allow a variable distortion or force on the elastic element, e.g. configurations, in which only one end of the elastic element has a conical or tapered circumference, or configurations, in which the elastic element is encircled by a clamp or clip.

The mass element may include or be comprised in any structural element of the detuner, or it may form part of a structure for mounting the detuner to the drive train. In the above embodiment including one or more support elements for the elastic element, the support element or elements may constitute also the mass element. Alternatively, the mass element may be provided as a separate member disposed coaxially with the elastic element or elements and/or longitudinally displaced therefrom.

In some embodiments of the invention, the detuner is arranged between the gearbox and the power converter to benefit from the gearing, i.e. to achieve the desired detuning effect with a comparatively low mass. However, in other embodiments, the detuner is arranged between the wind turbine rotor and the gearbox. Between the rotor and the gearbox, there is often more space available for the detuner than between the gearbox and the power converter. There is sometimes little free space available between the gearbox and the power converter, making access for mounting and maintenance of the detuner somewhat more complicated.

The detuner may be integrated in or form part of another component, such as a component of the drive train, such as a gearbox, a brake, or a power converter. Such integration of the detuner with another component alleviates mounting difficulties, in particular at the high-speed side of the gearbox, i.e. between the gearbox and the power converter, where only limited space is available. It should be understood that "integrated in" and "forming part of" in the present context is intended to mean that the detuner is connected to or housed in the other component in question, e.g. connected to or housed in a housing of the other component.

Embodiments are envisaged, in which a plurality of detuners are provided, e.g. one between the rotor and the gearbox, and one between the gearbox and the power converter.

The detuner(s) may be supported by a fixed support of the drive train, whereby an interconnection between the detuner(s) and the fixed support is preferably less elastic than the elastic element. In the present context, a fixed support should be understood as a support fixed relative to a rotating driving element of the drive train. The elasticities of the aforementioned interconnection and of the elastic element of the detuner may conveniently be defined in terms of spring constants, usually torsional spring constants. Thus, the interconnection between the detuner and the fixed support may define a first torsional spring constant, k1, and the elastic element may define a second torsional spring constant, k2. In preferred embodiments of the present invention, the first torsional spring constant k1 is preferably at least two orders of magnitude greater than the second torsional spring constant k2.

The detuner defines an angular resonance velocity, $\omega$, which is approximately equal to $\sqrt{k/j}$, where k denotes a detuner torsional spring constant, and j denotes an effective mass inertia of the detuner. When the detuner is mounted in the drive train, the angular resonance velocity of the drive train itself has been found to be approximately equal to the angular resonance velocity of the detuner $\omega$. The detuner torsional spring constant is approximately equal to (k1*k2)/(k1+k2). Hence, the detuner torsional spring constant k becomes approximately equal to k2 when k1 is significantly larger than k2. For purposes of modelling resonance frequencies, it may be desirable that k1 can be neglected at the design stage. Thus, k1 is preferably significantly larger than k2, most preferably at least two orders of magnitude greater than k2. The interconnection between the detuner and the fixed support is preferably a stiff connection.

A brake usually included in drive trains of wind turbines may conveniently serve as the fixed support for the detuner. The brake is normally provided downstream of the gearbox in the drive train, which is also the preferred location for the detuner. Additionally, due to its radial extent and mechanical strength the brake may usually provide the dimensions and stability required to support the detuner, there being optionally provided a separate flange between the mass element(s) of the detuner and the brake for increasing mechanical stability.

Alternatively, a coupling mechanism of the drive train may serve as the fixed support for the detuner. The coupling mechanism may e.g. comprise a coupling disc, to which the detuner is connected via a flange. The coupling mechanism usually includes a flexible pipe or shaft as a coupling element.

Figure 11:
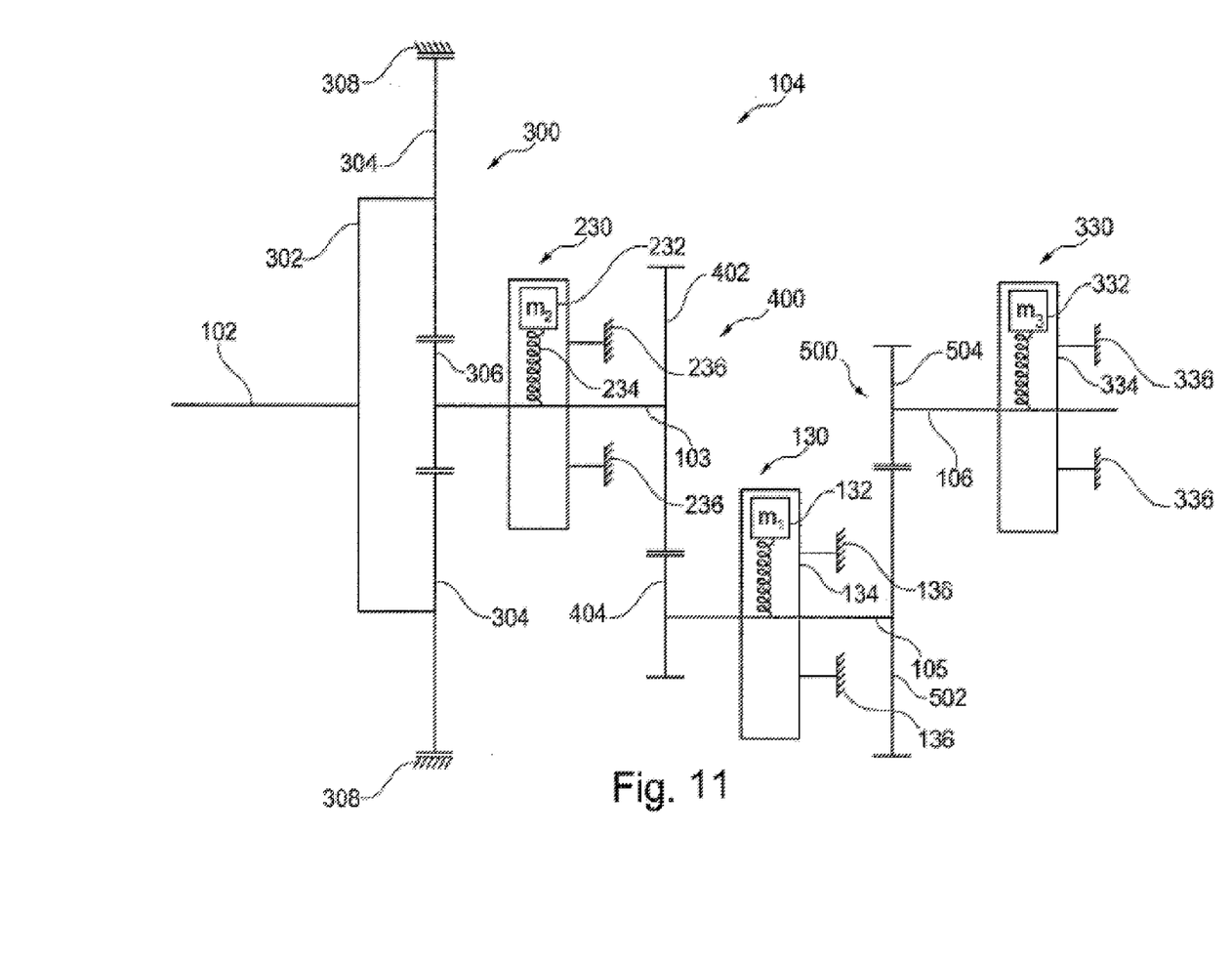
FIG. 11 illustrates a multi-stage gearbox of wind turbines according to the invention.

The embodiment of FIG. 11 comprises a first detuner 130 arranged at the output shaft 105 of the second stage 400 of the gearbox 104. The first detuner 130 comprises a first mass 132, and a first elastic element 134, which connects the mass 132 to the gearbox output shaft 105. The detuner 130 is supported by a fixed support 136, which may e.g. be in the form of brackets 124 or 224 as shown in FIG. 1. The embodiment of FIG. 11 further comprises a second detuner 230, comprising a second mass 232 and a second elastic element 234 connected to the output shaft 103 from the first stage 300 of the gearbox 104. The fixed supports 236 preferably form supports for the detuner 230, connecting it e.g. to a portion of a housing of the gearbox. The embodiment of FIG. 11 further comprises a third detuner 330, comprising a third mass 332 and a third elastic element 334 connected to the output shaft 106 from the third stage 500 of the gearbox 104. Fixed supports 336, which may be in the form of brackets 124 or 224 as shown in FIG. 1, support the third detuner 330.

The embodiments described above are merely examples of the invention defined by the claims that appear below. Those skilled in the design of wind turbines will appreciate additional examples, modifications, and advantages based on the description.

The invention claimed is:

1. A wind turbine, comprising:
   a wind-driven rotor for converting wind energy to a mechanical driving force;
   a power converter for converting the driving force to exploitable power; and
   a drive train for rotatably transmitting the driving force from the wind-driven rotor to the power converter, the drive train comprising:
   at least one rotatable driving element configured to provide at least one torsional resonance frequency in the drive train, wherein the at least one rotatable driving element comprises a gearbox arranged between the wind-driven rotor and the power converter, wherein the gearbox includes at least a first stage and a second stage, wherein the first stage includes a first input shaft and a first output shaft, wherein the second stage includes a second input shaft and a second output shaft, and wherein the respective output shafts are configured to rotate at higher speeds than respective input shafts;
   a first detuner having at least one first mass element with a first mass inertia and at least one first elastic element with first elastic properties, the first mass element and the first elastic element being arranged to rotate during operation of the wind turbine, wherein the torsional resonance frequency is influenced by the first mass inertia and the first elastic properties, wherein the first detuner is arranged at an output shaft of a final one of the stages of the gearbox; and
   a second detuner having at least one second mass element with a second mass inertia and at least one second elastic element with second elastic properties, the second mass element and the second elastic element being arranged to rotate during operation of the wind turbine, wherein the torsional resonance frequency is further influenced by the second mass inertia and the second elastic properties, and wherein the second detuner is arranged at an output shaft between two of the stages of the gearbox,
   wherein the first and second detuners are tuned for first and second frequencies, one of the first and second frequencies being lower than an operating frequency giving rise to tonality to be attenuated, and the other of the first and second frequencies being higher than the operating frequency.

2. The wind turbine according to claim 1, wherein the drive train includes first and second rotatable driving elements, the first and second detuners being mounted to the first and second rotatable driving elements.

3. The wind turbine according to claim 1, wherein the at least one rotatable driving element of the drive train comprises a gearbox arranged between the wind-driven rotor and the power converter, the gearbox including multiple stages with respective output shafts configured to rotate at higher speeds than respective input shafts, wherein the first and second detuners are arranged at an output shaft of a final one of the stages of the gearbox.

4. The wind turbine according to claim 1, wherein the at least one rotatable driving element of the drive train comprises a third stage, wherein the third stage is the final stage, wherein the second stage is arranged between the first stage and the third stage, wherein the third stage includes a third input shaft and a third output shaft, wherein the third output shaft is configured to rotate at higher speeds than the third input shaft, wherein the first detuner is arranged at the third output shaft, and wherein the second detuner is arranged at one of the first output shaft and the second output shaft.

5. The wind turbine according to claim 4, wherein the second detuner is arranged at the first output shaft, and further comprising a third detuner arranged at the second output shaft.

6. The wind turbine according to claim 1, wherein the difference between the first and second frequencies is less than 10%.

7. The wind turbine according to claim 1, wherein the operating frequency derives from a tooth mesh frequency in the gearbox.

8. The wind turbine according to 7, wherein the first stage of the gearbox includes a first planetary stage with a ring gear, planet wheels, and sun shaft, and wherein the operating frequency derives from a tooth mesh frequency between the planet wheels and sun shaft.

9. Wind turbine according to claim 1, wherein the first and second detuners are configured to provide attenuation of the torsional resonance frequency in an overlapping frequency range.

10. A method for reducing tonality in a wind turbine having a wind-driven rotor for converting wind energy to a mechanical driving force, a power converter for converting the driving force to exploitable power, and a drive train for rotatably transmitting the driving force from the wind-driven rotor to the power converter, wherein the drive train includes at least one rotatable driving element configured to provide at least one torsional resonance frequency, wherein the at least one rotatable driving element comprises a gearbox arranged between the wind-driven rotor and the power converter, wherein the gearbox includes at least a first stage and a second stage, wherein the first stage includes a first input shaft and a first output shaft, wherein the second stage includes a second input shaft and a second output shaft, and wherein the respective output shafts are configured to rotate at higher speeds than respective input shafts, the method comprising:
providing a first detuner having at least one first mass element with a first mass inertia and at least one first elastic element with first elastic properties;
providing a second detuner having at least one second mass element with a second mass inertia and at least one second elastic element with second elastic properties, wherein the first and second detuners are tuned for first and second frequencies, one of the first and second frequencies being lower than an operating frequency giving rise to tonality to be attenuated, and the other of the first and second frequencies being higher than the operating frequency;
arranging the first detuner at an output shaft of a final one of the stages of the gearbox so that the first mass element and the first elastic element rotates during operation of the wind turbine;
arranging the second detuner at an output shaft between the two stages of the gearbox so that the second mass element and the second elastic element rotates during operation of the wind turbine; and
whereby the torsional resonance frequency is influenced by the first and second mass inertias and first and second elastic properties to reduce tonality.

11. The wind turbine according to claim 1, wherein the first output shaft and the second input shaft are a common shaft.

12. The wind turbine according to claim 4, wherein the second detuner is arranged at the first output shaft.

13. The wind turbine according to claim 4, wherein the second detuner is arranged at the second output shaft.

14. A wind turbine, comprising:
a wind-driven rotor for converting wind energy to a mechanical driving force;
a power converter for converting the driving force to exploitable power; and
a drive train for rotatably transmitting the driving force from the wind-driven rotor to the power converter, the drive train comprising:
at least one rotatable driving element configured to provide at least one torsional resonance frequency in the drive train;
a first detuner having at least one first mass element with a first mass inertia and at least one first elastic element with first elastic properties, the first mass element and the first elastic element being arranged to rotate during operation of the wind turbine, wherein the torsional resonance frequency is influenced by the first mass inertia and the first elastic properties; and
a second detuner having at least one second mass element with a second mass inertia and at least one second elastic element with second elastic properties, the second mass element and the second elastic element being arranged to rotate during operation of the wind turbine, wherein the torsional resonance frequency is further influenced by the second mass inertia and the second elastic properties,
wherein the first and second detuners are tuned for first and second frequencies, one of the first and second frequencies being lower than an operating frequency giving rise to tonality to be attenuated, and the other of the first and second frequencies being higher than the operating frequency.

15. The wind turbine according to claim 14, wherein the difference between the first and second frequencies is less than 10%.

16. The wind turbine according to claim 14, wherein said at least one rotatable driving element of the drive train comprises a gearbox arranged between the wind-driven rotor and the power converter and the operating frequency derives from a tooth mesh frequency in the gearbox.

17. The wind turbine according to 16, wherein the gearbox includes a first planetary stage with a ring gear, planet wheels, and sun shaft, the operating frequency deriving from a tooth mesh frequency between the planet wheels and sun shaft.

* * * * *